United States Patent [19]
Kalish et al.

[11] Patent Number: 5,553,263
[45] Date of Patent: Sep. 3, 1996

[54] CACHE MEMORY SYSTEM WITH FAULT TOLERANCE HAVING CONCURRENTLY OPERATIONAL CACHE CONTROLLERS PROCESSING DISJOINT GROUPS OF MEMORY

[75] Inventors: David M. Kalish, Laguna Niguel; Saul Barajas, Mission Viejo; Paul B. Ricci, Laguna Niguel, all of Calif.

[73] Assignee: Unisys Corporation, Blue Bell, Pa.

[21] Appl. No.: 92,835

[22] Filed: Jul. 16, 1993

[51] Int. Cl.⁶ .......................... G06F 12/02; G06F 12/08; G06F 13/00; G06F 11/20

[52] U.S. Cl. .................. 395/454; 395/447; 395/182.03; 364/243.44; 364/964.33; 364/943.92; 364/DIG. 1

[58] Field of Search ..................................... 395/454, 455, 395/456, 468, 403, 446, 447, 454, 456, 182.03

[56] References Cited

U.S. PATENT DOCUMENTS

| | | | |
|---|---|---|---|
| 4,381,541 | 4/1983 | Baumann, Jr. et al. | 364/200 |
| 4,445,172 | 4/1984 | Peters et al. | 364/200 |
| 4,724,518 | 2/1988 | Steps | 364/200 |
| 4,905,141 | 2/1990 | Brenza | 364/200 |

*Primary Examiner*—Eddie P. Chan
*Assistant Examiner*—Kevin L. Ellis
*Attorney, Agent, or Firm*—Alfred W. Kozak; Mark T. Starr; Steven R. Petersen

[57] ABSTRACT

A processor cache memory system utilizes separate cache controllers for independently managing even and odd input address requests with the even and odd address requests being mapped into the respective controllers. Each cache controller includes tag RAM for storing address tags, including a field for storing the least significant address bit, so that the stored tags distinguish between the odd and even addresses. Upon failure of a cache controller, both the even and odd addresses are directed to the operational controller and the stored least significant bit address tag distinguishes between the odd and even input addresses to appropriately generate HIT/MISS signals. The controllers include block address counter logic for generating respective even and odd invalidation addresses for simultaneously performing invalidation cycles thereon when both controllers are operational. When a controller fails, the block address counter logic generates both even and odd block invalidation addresses in the operational controller.

15 Claims, 4 Drawing Sheets

CACHE MEMORY SYSTEM WITH FAULT TOLERANCE HAVING CONCURRENTLY OPERATIONAL CACHE CONTROLLERS PROCESSING DISJOINT GROUPS OF MEMORY

CROSS-REFERENCE TO RELATED APPLICATION

Co-pending U.S. patent application Ser. No. 08/078,361; filed Jun. 15, 1993 now U.S. Pat. No. 5,506,967 entitled "Storage Queue With Adjustable Level Thresholds For Cache Invalidation Systems In Cache Oriented Computer Architectures"; by Saul Barajas et al.; assigned to the assignee of the present invention. Said U.S. Pat. No. 5,506,967 is incorporated herein by reference.

BACKGROUND OF THE INVENTION

1. Field of the Invention

The invention relates to cache memory architecture particularly with respect to processor private cache in a digital computer system.

2. Description of the Prior Art

Present day digital computer architectures often include interconnected subsystems comprising a plurality of central processor modules, a main memory subsystem and one or more I/O subsystems. The central processor modules, main memory and I/O subsystems preferably intercommunicate by a time-shared bus system intercoupling the component sections of the computer system. In this architecture, each central processor module may include a private cache into which the processor copies words from main memory utilizing the cache in performing its processes. For example, a processor may copy program instructions and data from main memory to its cache and, thereafter, execute the program task from cache. As is appreciated, cache is used in this manner to enhance performance. The cache memory is significantly faster than main memory and the processor with the cache avoids going back and forth on the bus to main memory for each instruction. The close proximity of the cache memory to the processor results in fast data accessing by the processor. Instead of being burdened by the slow data retrieval normally associated with accessing main memory, the processor can receive a copy of the data held by the faster cache.

Cache memories are generally smaller than main memory therefore holding only a subset of the main memory data. All of the main memory addresses, accordingly, are mapped into the smaller Cache memory.

When the processor requests a word from memory, the cache is addressed to determine if a copy of the data resides therein. If the cache is storing the data, the processor receives a cache HIT indication and the data is transferred from the cache to the processor. If the data is not present in the cache, a cache MISS occurs and main memory is accessed for the data word which is transmitted to the processor across the system buses. A copy of the "missed" data word is also transmitted to the cache memory and stored therein.

It is important in such systems to maintain cache consistency. The data used by a processor from its cache memory must be coherent and updated with respect to the corresponding data in main memory. All copies of information at a specific address in all of the memory facilities must be maintained identical. For example, if a first one of the processors executes a write to memory overwriting a main memory location that had been copied by a second one of the processors into its cache, the data in that location of the cache of the second processor becomes obsolete and invalid.

Computer systems with cache memories maintain data integrity by using a cache invalidation process. The process involves each cache system monitoring, or spying upon, the memory operations of the other processors and subsystems in the computer. This is conventionally accomplished by monitoring the memory write operations on the bus. When a memory write operation is detected, each cache memory system must, at some time, execute an internal cache invalidation operation or cycle. The cache invalidation cycle involves testing the contents of the cache for the specific address of the write operation that was detected. If the cache memory system determines that it contains this address, the system marks the address as invalid. When the processor attempts to access data from an invalid cache address, a cache MISS is returned to the processor and the contents of the invalid cache location is updated from main memory.

Computer systems of the type described often perform block write operations that overwrite a block of main memory words where the block may comprise, for example, four locations. The block is designated by a block address. When the spy mechanism of a cache invalidation system detects a block address and a HIT is indicated, the invalidation system must mark all of the cache addresses corresponding to the individual address locations within the block as invalid.

Generally, the cache memory system comprises cache data RAMs for storing the main memory data and a cache controller to manage processor requests and invalidation operations. The cache controller utilizes a system of tag RAMs, comprising a directory, to determine if a particular address is present in the cache. The tag RAMs are utilized both for processor data read cycles and invalidation cycles. Generally, the lower portion of the main memory address is utilized to address the tag RAMs and the upper portion of the main memory address is stored at the addressed tag RAM location. A validity bit is stored with the upper address portion denoting if the cache location is valid or invalid. Thus, by addressing the tag RAMs with the lower portion of main memory address and comparing the upper portion thereof with the stored upper address portion, a cache HIT with respect to a main memory address is uniquely determined.

In computer-systems of the type described, failure of the cache memory system of a processor required the processor to be shut down with the computing system load carried by the remaining processors on the bus. It was necessary to disable the processor in which the cache failed because the performance of the processor without the assistance of the cache would be too slow to be compatible with operation of the remainder of the system. This resulted in a system performance degradation approximately proportional to the processing load normally carried by the disabled processor. For example, in a system with two processors, a 50% degradation in system performance may result.

A concept recognized in the prior art is that of fault tolerance. A component is characterized as fault tolerant if the component is designed to continue operation although a component fault or failure has occurred. Normally, the fault is a hardware failure. Key elements of a system may be designed to be fault tolerant to achieve a high level of system availability. Typically, a component achieves fault tolerance by utilizing an identical standby redundant component. If the on-line component fails, the standby redundant component is brought on-line to continue the performance of the failed component.

Theoretically, the cache memory system could be rendered fault tolerant by utilizing a back-up redundant off-line cache memory system. As a practical matter, cache memory systems usually do not have redundant back-ups since such systems are very expensive and occupy a significant amount of space on the system printed circuit boards. Additionally, this approach is costly in that the redundant cache system is normally idle. The redundant cache system is merely occupying valuable printed circuit board real estate without contributing to normal system performance. The function of the redundant system is to continue system availability at the normal performance level in the event of failure of the active cache.

In addition to the described disadvantages, the prior art cache architectures are undesirably slow in that when the system is performing one of the operations of servicing the processor or executing invalidations, the other operation cannot be performed. When the cache system is performing one operation, it is busy to the other. The above-described prior art cache system architectures are not readily configurable for simultaneously performing invalidations and servicing the processor. Additionally, when a block address is detected for invalidation, the addresses comprising the block must be sequentially invalidated thereby requiring an undesirably long time to complete the process.

A fault tolerant cache memory system is disclosed in U.S. Pat. No. 4,905,141, issued Feb. 27, 1990. The system of said U.S. Pat. No. 4,905,141 utilizes multiple cache partitions operating independently and in parallel where any request address can be connected to any or all partitions. A two-level global and local search is performed involving partition look-aside tables and partition directories. If a cache partition fails, the partition is decoupled from Service and the cache continues to operate with degraded capacity.

It is expected that the HIT ratio of the system of said U.S. Pat. No. 4,905,141 will degrade when cache partitions fail since the number of directory sets into which address requests can be mapped has diminished, i.e., the set associativity of the degraded cache has been reduced. The system of said U.S. Pat. No. 4,905,141 tends to utilize an excessive amount of cache memory, replicated logic, and complex control resources, including complex address and data switching, thereby suffering from the disadvantages discussed above. The two-level search procedure utilized is undesirably time consuming. Because of the architecture of the cache control logic of said U.S. Pat. No. 4,905,141, the cache memory system thereof cannot simultaneously service processor request addresses and invalidation addresses thereby suffering from disadvantages of prior art systems described above. Similarly, the cache memory system of said U.S. Pat. No. 4,905,141 cannot simultaneously perform invalidations on multiple addresses; e.g., multiple addresses of a block, again suffering from the above-described disadvantages.

SUMMARY OF THE INVENTION

The above disadvantages of the prior art are obviated by a cache memory system having peer operational sections into which disjoint groups of main memory addresses are mapped, respectively. Each main memory address is comprised of a plurality of bits and a portion of these bits are stored as tags in the cache sections to identify the main memory addresses in the cache. Each cache section also stores, as part of the tag, a portion of main memory address bits identifying the disjoint group to which a main memory address belongs. During normal operation, processor request addresses and invalidation addresses are directed to the cache section associated with the appropriate address group and each operational section processes the addresses in the main memory address group associated therewith. Together, both sections participate in the processing load and in the address invalidation process over the full range of main memory addresses. If one or more sections should fail, the cache memory system reverts to a degraded mode in which the remaining operational sections continue the processing for the full range of main memory addresses. All cache requests and invalidations are directed to the operational sections in the degraded mode. After a momentary drop, cache performance returns to almost the same performance level of the fully operational cache memory system. Initially, upon entering the degraded mode, cache MISS indications are returned in response to cache requests for addresses in the groups associated with the failed sections because of the group indicating bits in the tag. The system continuously stores current main memory data into cache locations that return a cache MISS. Thus, currently active main memory locations that were stored in a failed section rapidly become resident in the operational sections. By this design, the cache memory system of the present invention is rendered fault tolerant.

Each section of the cache memory system includes multiple sets of tag RAM to enhance the HIT ratio. When one or more sections fail, the system of the present invention tends to suffer only a slight degradation in HIT ratio compared to the non-degraded status. In the degraded state, all processor address requests and invalidation addresses are directed to the operational sections. Although in the degraded state, depth of cache memory is diminished, the set associativity with respect to main memory addresses is maintained. An address to be serviced is searched over the same number of tag sets in the degraded as in the non-degraded mode thus tending to maintain the HIT ratio.

The invention is preferably embodied in a cache system utilizing two sections for processing the odd and even main memory addresses, respectively. This embodiment is facilitated by storing the least significant bit of the main memory address as part of the address tag. In the degraded mode, the operational section momentarily returns cache misses for main memory addresses that are stored in the failed section but rapidly fills with current data with respect to both odd and even addresses. Both sections of the cache utilize the same number of plural tag RAMs for address searching thus maintaining substantially the same HIT ratio in the degraded mode as in the normal operating mode.

The configuration of the present invention permits block invalidations to be rapidly performed in that the odd and even addresses of the block can be simultaneously invalidated during normal operation of the system. Furthermore, during normal operation, simultaneous processor requests and internal invalidation operations can be simultaneously performed independently in the respective operational sections. Additionally, when the processor does not require service, the operational sections can simultaneously and independently perform invalidation cycles.

DESCRIPTION OF THE PREFERRED EMBODIMENTS

Figure 1:
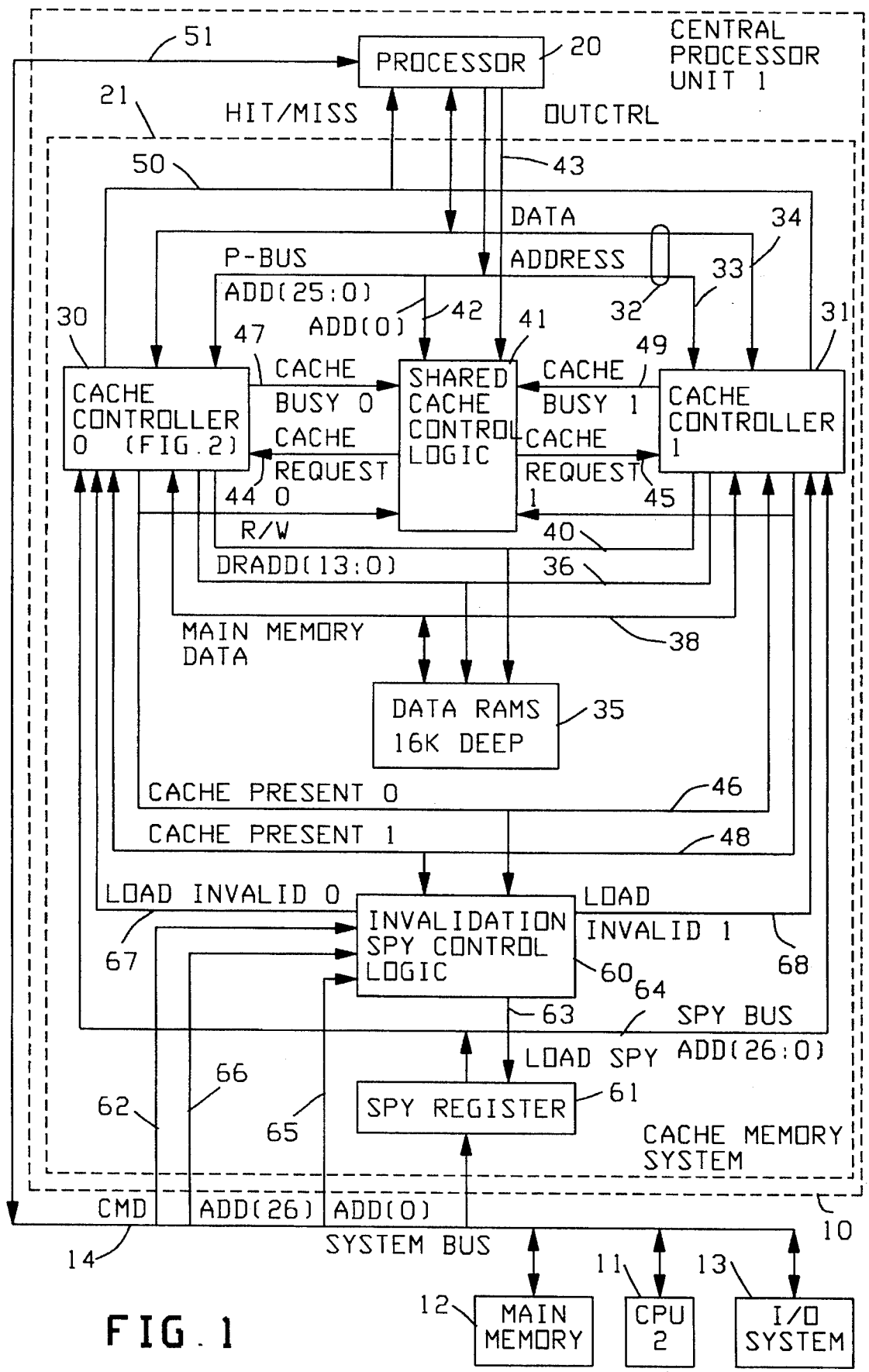
FIG. 1 is a schematic block diagram illustrating the cache memory system architecture in accordance with the present invention.

Referring to FIG. 1, a computer system is illustrated similar to that disclosed in said U.S. Pat. No. 5,506,967. The computer system comprises first and second central processor units 10 and 11, a main memory system 12 and an I/O system 13 interconnected by a system bus 14. The central processor units 10 and 11 are identical with respect to each other and may, for example, comprise microprocessors for concurrent execution of programs. The main memory system 12 stores the user software instructions and data for the operations to be performed by the computer system. The I/O system 13 couples I/O peripherals into the system. The system bus 14 is a conventional time-shared bus conveying addresses, data and commands among the modules 10–13.

The central processor unit 10 includes a processor 20 and a cache memory system 21. The processor 20 and the corresponding processor in the central processor unit 11 may comprise respective microprocessors for concurrent execution of programs. The cache memory system 21 comprises a fast memory for storing instructions and data read from the main memory 12 by the processor 20, so that the processor 20 can operate thereupon without requiring numerous accesses to the system bus 14 and the main memory 12. As is appreciated, a significant enhancement in performance is achieved by this arrangement.

Data coherence must be maintained among copies of the same data in the cache memory system 21, the corresponding cache memory system in the central processor unit 11 and in the main memory 12. For example, invalid data in the cache memory system 21 would result if the I/O system 13 would overwrite locations of the main memory 12 from which the processor 20 had cached data in the cache memory system 21. The cache memory system 21 includes a spy system for monitoring the system bus 14 for writes to the other memories, such as the main memory 12, of the computer system of FIG. 1. The cache memory system 21 further includes an invalidation system to determine if the detected write addresses are in the cache and to mark these cache locations invalid. The cache memory system 21 operates in accordance with the present invention, in a manner to be described, to provide fault tolerant performance as well as to provide rapid execution of data and invalidation cycles including rapid performance of block invalidations.

With continued reference to FIG. 1, the cache memory system 21 is configured in a cache "slice" address interleaved architecture for providing fault tolerant performance. The cache memory system 21 includes first and second cache controllers 30 and 31 for managing the even and odd main memory addresses, respectively. The processor 20 communicates with the cache controllers 30 and 31 over a P-bus 32 comprised of an address bus portion 33 and a data bus portion 34. The cache memory system 21 stores main memory data in data RAMs 35. The data RAMs 35 store 16K words of processor data or processor program words.

The main memory 12 is accessed by a 26 bit address word denoted as ADD(25:0). In the herein described embodiment of the invention, the address portion 33 of the P-bus 32 is 26 bits wide accommodating ADD(25:0).

The least significant bit of ADD(25:0), denoted as ADD(0), determines whether a main memory word is even or odd. If ADD(0) is 0, the main memory word is even and if ADD(0) is 1, the main memory word is odd. An additional bit, ADD(26), is included in the address to denote if ADD(25:0) designates one word of memory or is the starting address of a block of words. In the computer system of the present invention, four word blocks are utilized. When ADD(26) is 0, one memory word is designated. When ADD(26) is 1, a block is indicated.

Main memory 12, having a 26 bit wide address, contains approximately 64M words. The data RAMs 35 can store words from main memory 12 over the full range of main memory addresses. The cache data RAMs 35 are addressed by DRADD(13:0) from the cache controllers 30 and 31 via shared 14 bit bus 36 to access the 16K words thereof. The data RAM address DRADD(13:0) is generated by the cache controllers 30 and 31 in a manner to be described. The processor 20 receives words stored in the data RAMs 35 either through the cache controller 30 or the cache controller 31 via shared main memory data bus 38. The data on the bus 38 are transmitted through the respective cache controllers to the data portion 34 of the P-bus 32. In a similar manner, a data word placed on the P-bus 32 by the processor 20 is entered into the data RAMs 35 either through the cache controller 30 or the cache controller 31 via the bus 38. Read/Write control of the data RAMs 35 is effected by either the cache controller 30 or the cache controller 31 via a line 40.

The processor 20 also communicates with the cache controllers 30 and 31 via shared cache control logic 41. The shared cache control logic 41 receives an input from ADD(0) on the address portions 33 of the P-bus 32 via a line 42 to distinguish between odd and even addresses. The processor 20 issues a signal OUTCTRL on a line 43 to the shared cache control logic 41 to solicit cache services from the cache controllers 30 and 31. The OUTCTRL signal is issued, for example, when the processor 20 desires to read data from a memory address. The processor 20 places the address on the P-bus 32 and then issues the OUTCTRL signal on the line 43. The shared cache control logic 41 issues the request to the cache controller 30 or the cache controller 31 via a CACHE REQUEST 0 signal on a line 44 or a CACHE REQUEST 1 signal on a line 45, respectively. During normal operation, the shared cache control logic 41 directs cache requests for even addresses to the cache controller 30 and for odd addresses to the cache controller 31. The logic 41 distinguishes between the even and odd addresses using address bit 0 on the line 42. If, however, one of the cache controllers 30 or 31 becomes disabled, all cache requests are then directed to the operational cache controller.

The cache controller 30 issues a CACHE PRESENT 0 signal on a line 46 and a CACHE BUSY 0 signal on a line 47. The cache controller 30 issues the CACHE PRESENT 0 signal to indicate whether the controller is operational or disabled. The cache controller 30 issues the CACHE BUSY 0 signal to indicate if the controller is busy performing an invalidation and therefore not available to the processor 20 for cache services. In a similar manner, the cache controller 31 issues a CACHE PRESENT 1 signal on a line 48 and a CACHE BUSY 1 signal on a line 49. The CACHE PRESENT 0 signal on the line 46 is applied as an input to the cache controller 31 and the CACHE PRESENT 1 signal on the line 48 is applied as an input to the cache controller 30. Each cache controller receives the CACHE PRESENT signal from the other cache controller to relate the operational status of each controller to the other for the purposes of performing block invalidations, in manner to be described.

The CACHE PRESENT 0 signal on the line 46 and the CACHE PRESENT 1 signal on the line 48 are also applied to the shared cache control logic 41. When the CACHE PRESENT signals indicate that both cache controllers 30 and 31 are operational, the shared cache control logic 41 directs the even and odd address requests to the appropriate cache controllers, as described above. If one of the cache controllers becomes disabled, all of the processor cache requests are submitted to the operational controller as indicated by the CACHE PRESENT signals.

The CACHE BUSY 0 signal on the line 47 and the CACHE BUSY 1 signal on the line 49 are applied to the shared cache control logic 41. If the processor 20 submits a cache request to a cache controller that is busy performing invalidation operations, the request is deferred until the cache controller becomes available.

When the processor 20 requests the contents of an address, the appropriate cache controller searches the tag RAMs thereof to determine if the address is stored in cache and returns a HIT if the address is cached or a MISS if the address is not in cache. The HIT/MISS signal from the cache controllers 30 and 31 are combined on a line 50 and returned to the processor 20. If the result of the CACHE REQUEST is a HIT, the accessed 6ache controller addresses the data RAMs 35 to retrieve the data via the address bus 36. The accessed data is returned to the P-bus 32 via the accessed cache controller and the data bus 38.

If the result is a MISS, the processor 20 goes out on the system bus 14 via a path 51 to retrieve the data from main memory 12. The accessed cache controller stores the address in tag RAM, in a manner to be described, and the processor 20 transmits the data via the P-bus 32 through the accessed cache controller to be stored in the data RAMs 35 at the now tagged address.

As discussed above and in said U.S. Pat. No. 5,506,967, cache coherency is maintained by the cache controllers 30 and 31 invalidating tags stored in the tag RAMs when the words associated with the tags are modified, such as by overwriting in main memory. The modifications can be one-address operations or a four-address block operation. The invalidation addresses are received on the system bus 14. In the case of a block invalidation, only the first address of the block is received, but the block data has been modified in that address as well as in the next three consecutive addresses. Thus, there is a requirement for all of the addresses in the four-word block to be invalidated by the cache.

Invalidations spy control logic 60 and a spy register 61 are utilized to provide the potential invalidation addresses. The invalidation spy control logic 60 monitors the system bus 14 for commands that could potentially modify data stored in the system that may be resident in the data RAMs 35 of the cache. The monitoring is performed by a command bus 62 and decoding logic (not shown) in the invalidation spy control logic 60. Such a command may be a WRITE that overwrites a location in main memory 12. When the command is detected by the logic 60, a LOAD SPY signal is issued on a line 63 to load the spy register 61 from the system bus 14 with the potential invalidation address. The invalidation address is 27 bits wide comprising the 26 bit main memory address ADD(25:0) and the four-address block bit ADD(26). The spy register 61 communicates the potential invalidation address to the Cache controllers 30 and 31 via a 27 bit wide spy bus 64.

The invalidation spy control logic 60 receives the least significant address bit ADD(0) from the system bus 14 via a line 65 designating if the potential invalidation address is even or odd. The invalidation spy control logic 60 also receives the block designation bit ADD(26) from the system bus 14 via a line 66 denoting whether the potential invalidation address is for one-word or for a four-word block. The CACHE PRESENT 0 signal on the line 46 and the CACHE PRESENT 1 signal on the line 48 are also applied to the invalidation spy control logic 60 to inform the logic 60 of the operational status of the cache controllers 30 and 31, respectively.

The invalidation spy control logic 60 issues a LOAD INVALID 0 signal to the cache controller 30 on a line 67 to load the potential invalidation address on the spy bus 64 into the invalidation queue of the cache controller 30. In a similar manner, the invalidation spy controls logic 60 issues a LOAD INVALID 1 signal to the cache controller 31 on a line 68 to load the potential invalidation address on the spy bus 64 into the invalidation queue of the cache controller 31.

When both cache controllers 30 and 31 are operational, the invalidation spy control logic 60 issues the appropriate LOAD INVALID command to the appropriate cache controller so as to direct one-word even invalidation addresses to the cache controller 30 and one-word odd invalidation addresses to the cache controller 31. Additionally when both cache controllers 30 and 31 are operational, block invalidation addresses are directed simultaneously to both controllers. If, however, one of the CACHE PRESENT signals indicates that the associated cache controller has been disabled, all invalidation addresses are directed to the operational cache controller.

Thus, logic (not shown) is included in the invalidation spy control logic 60 that issues the LOAD INVALID 0 signal and the LOAD INVALID 1 signal whenever the spy register 61 receives the LOAD SPY command on the line 63 as follows. In response to CACHE PRESENT 0 and CACHE PRESENT 1 indicating presence of both cache controllers and with ADD(26) on the line 66 indicating a block address, both LOAD INVALID 0 and LOAD INVALID 1 are issued. When both cache controllers are present and ADD(26) indicates a one word invalidation, LOAD INVALID 0 is issued when ADD(0) on line 65 indicates an even address and LOAD INVALID 1 is issued when ADD(0) indicates an odd address. When one of the CACHE PRESENT signals indicates that cache controller is disabled, the LOAD INVALID signal is issued only to the operational cache controller for even addresses, odd addresses and block addresses.

The cache controller 30 is substantially identical to the cache controller 31. Details of the cache controller 30 are illustrated in FIG. 2.

Figure 2:
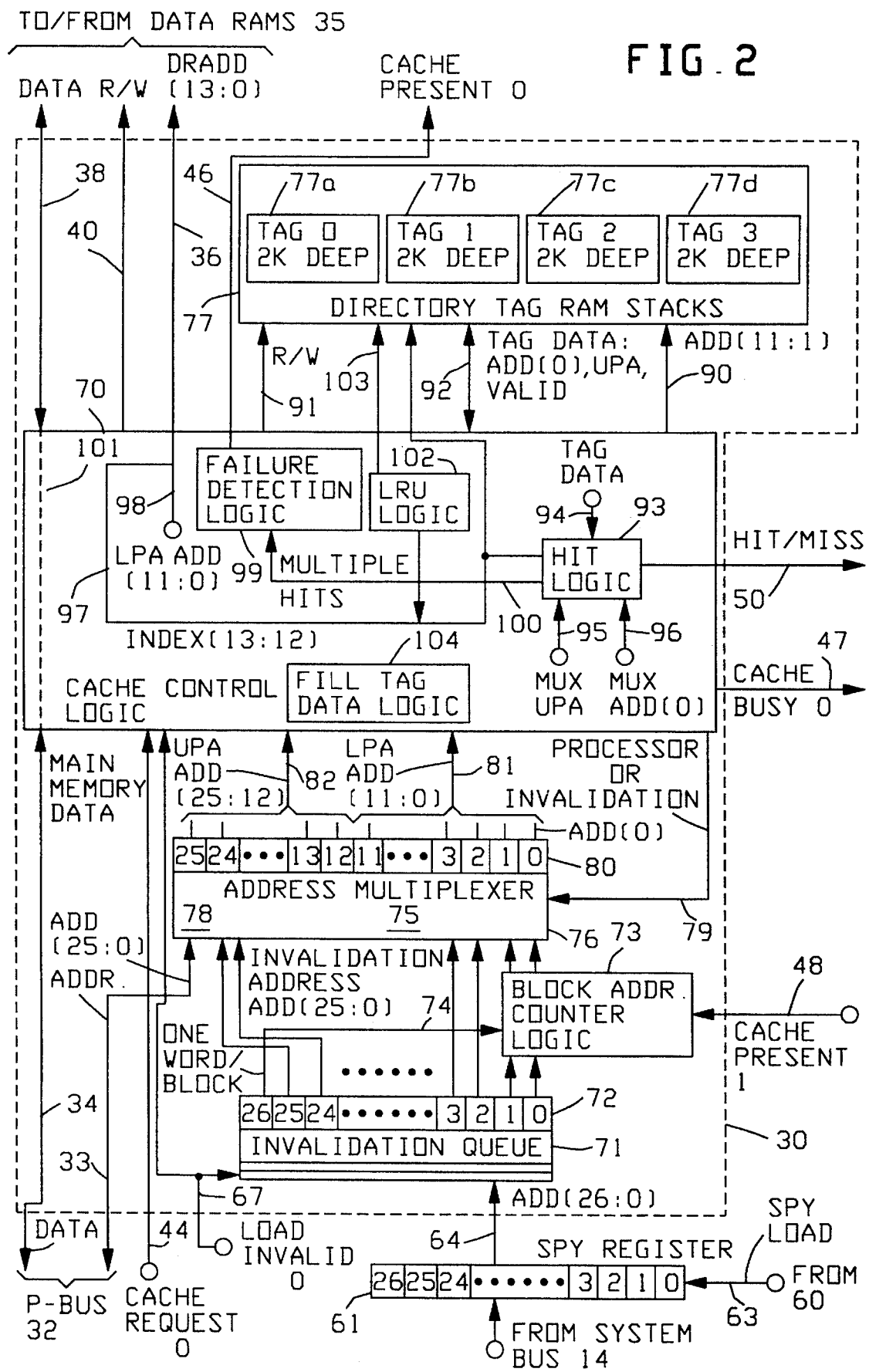
FIG. 2 is a schematic block diagram illustrating details of one of the cache controllers of FIG. 1.

Referring to FIG. 2, in which like reference numerals indicate like components with respect to FIG. 1, details of the cache controller 30 and the spy register 61 are illustrated. The cache controller 30 includes cache control logic 70 for directing the various functions performed by the controller 30 and for generating various signals issued thereby. The spy register 61 receives the 27 bit potential invalidation address ADD(26:0) from the system bus 14 and transmits the address to invalidation address FIFO queue 71 via the spy bus 64. Details of the invalidation queue 71 are described in said U.S. Pat. No. 5,506,967. The LOAD INVALID 0 signal on the line 67 loads the addresses from the spy bus 64 into the queue 71 wherein they ripple to an upper position 72 thereof for withdrawal into the invalidation processing. Block address counter logic 73 is included to generate the two least significant invalidation address bits ADD(1:0) in accordance with the different operational conditions.

The block address counter logic 73 includes a two-bit invalidation address counter (not shown) which is responsive to the one-word/block bit ADD(26) via a line 74, to ADD(1:0) from the invalidation queue 71, and to the CACHE PRESENT signal on the line 48 from the cache controller 31. The block address counter logic 73 also includes an identification flip-flop ID (not shown) that is set to identify the cache controller as odd or even. Since the cache controller 30 manages the even addresses, ID is set to,zero. The ID flip-flop in the cache controller 31 is set to one. The invalidation queue 71 and the block address counter logic 73 provide an invalidation address input 75 to an address multiplexer 76. The invalidation queue 71 supplies ADD(25:2) and the block address counter logic 73 provide ADD(1:0) of the 26 bit invalidation address input 75.

As discussed above, the invalidation queue 71 supplies the first address of a four-word block to be invalidated. Under normal operating conditions, the cache controller 30 invalidates the even addresses of the block and the cache controller 31 invalidates the odd addresses of the block. Under degraded conditions, the operational controller invalidates all of the four-block addresses.

For one-word invalidations with ADD(26) set to 0, ADD(1:0) of the invalidation queue 71 is steered unmodified through the block address counter logic 73 to the ADD(1:0) bits of the input 75 of the address multiplexer 76. This is the state of the logic 73 for both cache controllers 30 and 31 during normal operation and for the operational controller during the degraded condition.

When four-word block invalidations are performed with ADD(26) set to 1, ADD(1:0) of the input 75 of the address multiplexer 76 are generated by the block address counter logic 73. Under normal operating conditions, as indicated by the CACHE PRESENT 1 signal on the line 48, ADD(0) iS supplied by the ID flip-flop in the logic 73 and ADD(1) is toggled from zero to one. In this manner, the logic 73 of the cache controller 30 generates the even addresses of the block. Preferably, this is accomplished by causing the two-bit counter in the logic 73 to count from zero to one and then reset with the least significant stage thereof, CNTR(0), being steered to provide ADD(1). Similarly, the corresponding logic in the cache controller 31 generates the odd addresses of the block.

During degraded operation, as indicated by the CACHE PRESENT 1 signal on the line 48 and the CACHE PRESENT 0 signal on the line 46, the outputs of the two counter stages, CNTR(1:0), of the two-bit counter are steered to the ADD(1:0)invalidation address inputs, respectively, of the address multiplexer 76. The two-bit counter is reset after counting 0, 1, 2 and 3. Thus, the four-block addresses to be invalidated are generated by the operational cache controller.

The cache controller 30 includes tag RAM stack resources 77 for determining if the cache memory system 21 is storing an address. As described in said U.S. Pat. No. 5,506,967, the tag RAM resources 77 are utilized both to service processor requests and to perform internal invalidations. When the cache controller 30 is busy performing invalidations, the CACHE BUSY 0 signal on the line 47 is raised. The invalidation addresses are provided at the input 75 of the address multiplexer 76 and the processor request addresses are received from address portion 33 of the P-bus 32 at an input 78 to the address multiplexer 76. The cache control logic 70 controls the address mutiplexer 76 via a line 79 to switch either the 26 bit invalidation address at the input 75 or the 26 bit processor request address at the input. 78 to a 26 bit address output 80 thereof. The cache control logic 70 selects the input 75 or the input 78 in accordance with whether the cache controller 30 is performing an invalidation or servicing the processor 20 (FIG. 1), respectively.

As described above, processor service is initiated by the CACHE REQUEST 0 signal on the line 44. As described in said U.S. Pat. No. 5,506,967, internal invalidation processing is initiated when an invalidation address is resident at the output 72 of the invalidation queue 71. The 26 bit address at the output 80 of the address multiplexer 76 is considered comprised of a Lower Partial Address (LPA) 81 and an Upper Partial Address (UPA) 82. The LPA 81 is comprised of the-low order 12 address bits ADD(11:0) and the UPA 82 is comprised of the high order 14 address bits ADD(25:12). The LPA 81 and UPA 82 are applied to the cache control logic 70 for processing thereby.

Figure 3:
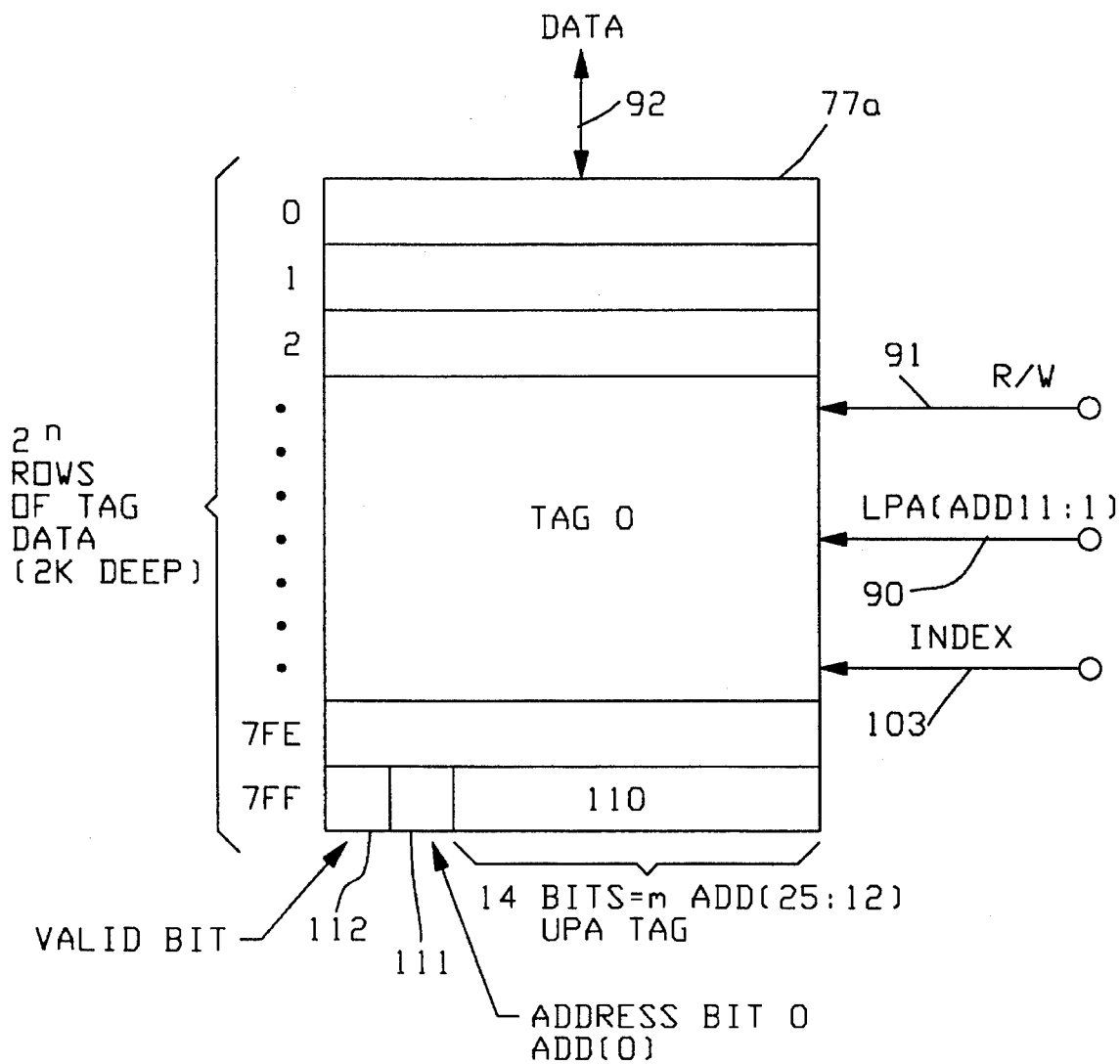
FIG. 3 is a diagram illustrating the data storage in the tag RAMs of the cache controllers of FIG. 1 in accordance with the invention.

The tag RAM stacks 77 are comprised of four stacks of RAM 77a, 77b, 77c and 77d, each 2K words deep and 16 bits wide. The tag RAM stacks 77a, 77b, 77c and 77d are denoted as Tag 0, Tag 1, Tag 2 and Tag 3, respectively. Each tag word has a 14 bit field for storing the UPA, a 1 bit field for storing ADD(0) and a 1 bit field for storing a valid indication as is illustrated in FIG. 3. The cache control logic 70 addresses the tag RAM stacks 77a–77d in parallel via a bus 90 utilizing address bits ADD(11:1) of the LPA. The cache control logic 70 controls the tag RAM stacks 77 to read data from, or write data into, the accessed tag RAM stack locations via a Read/Write signal on a line 91. The accessed tag data from the four stacks are applied to the cache control logic 70 via a bus 92. The bus 92 is also utilized to enter data into the accessed tag RAM locations for storage therein.

The cache control logic 70 utilizes HIT logic 93 to determine if a processor request address or an invalidation address, as provided by the address multiplexer 76, is resident in the cache. An address is resident in the cache when the UPA and ADD(0) data stored at a tag RAM location accessed by ADD(11:1) matches the UPA and ADD(0) of the input address, and the valid bit of the accessed tag is set. When these conditions occur, the HIT logic 93 places a HIT signal on the line 50. The HIT is also indexed in accordance with the tag RAM stack in which the tag is located.

Accordingly, to Search the cache for an input address applied from the address multiplexer 76, ADD(11:1) addresses the tag stacks 77a–77d in parallel via the bus 90. The cache control logic 70 sets the Read/Write line 91 to Read. The 16 bit tag data word from the accessed location in each of the tag stacks are applied in parallel to the HIT logic 93 via the bus 92 and a bus 94. The four accessed tag data words are applied in parallel to four respective comparison circuits (not shown) in the logic 93 that are commonly connected to receive as inputs the UPA and ADD(0) signals from the multiplexer 76 via buses 95 and 96, respectively. The valid bit from the four accessed tag words are also applied as inputs to the four comparison circuits, respectively. If one off the comparison circuits detects UPA and ADD(0) equality and the valid bit for that comparison circuit is set, the HIT line output (not shown) of that comparison circuit raises the HIT/MISS line 50.

The HIT line output from each of the comparison circuits within the hit logic 93 is encoded by encoding circuitry (not shown) within the logic 93 to provide two index bits designating the tag RAM stack that engendered the HIT. The index bits are denoted as INDEX(13:12) and are applied on a bus 97. If the HIT is from the TAG 0 stack, INDEX(13:12) is encoded as 00. If the HIT is from the TAG 1 stack, INDEX(13:12) is encoded as 01. If the HIT is from the TAG 2 stack, INDEX(13:12) is encoded as 10. If the HIT is from the TAG 3 stack, INDEX(13:12) is encoded as 11. The index bits INDEX(13:12) are concatenated with LPA provided on a bus 98 to form the 14 bit data RAM address DRADD(13:0) on the bus 36, INDEX(13:12) being the two most significant bits thereof.

The four HIT lines within the logic 93 are also monitored for HITs on more than one HIT line which would indicate a failure condition requiring the cache controller 30 to be disabled. If this condition occurs, the HIT logic 93 issues a multiple HIT signal to failure detection logic 99 via a line 100. The failure detection logic 99 provides the CACHE PRESENT 0 signal on the line 46.

When a valid HIT occurs in response to a processor request, the appropriate data RAM address is placed on the data RAM address bus 36 and the Read/Write line 40 is set to read. The contents of the accessed data RAM location is sent to the data portion 34 of the P-bus 32 via the bus 38 through the cache controller 30 along a path 101.

If the HIT occurs in response to an invalidation address, the cache control logic 70 sets the valid bit of the tag RAM location that engendered the HIT to the invalid state. This is accomplished by setting the Read/Write signal on the line 91 to the Write state, accessing the tag RAM location by ADD(11:1) and INDEX(13:12) via buses 90 and 97 and sending the appropriate valid bit data to the tag RAM stacks 77 via the bus 92. It is appreciated that during a processor request cycle, the hit logic 93 will return a MISS signal to the line 50 for an address with matching UPA and ADD(0) but marked invalid.

During processor request cycles, when the hit logic 93 detects a MISS for the input address, the processor 20 (FIG. 1) accesses the data at the main memory location, as described above, and places the data on the data portion 34 of the P-bus 32. Conventional Least Recently Used (LRU) logic 102 selects an LRU tag RAM stack for the LPA in which to store the address. The appropriate tag RAM stack is selected by a bus 103. The location in the selected stack is accessed by ADD(11:1) on the bus 90. The cache control logic 70 sets the Read/Write line 91 to Write and conventional fill tag data logic 104 provides the appropriate data via the bus 92 to store in the location. The valid bit is set to valid and the UPA and ADD(0) fill data are provided to the cache control logic 70 by the input address. The LRU logic 102 also generates appropriate index bits, as discussed above, to form the appropriate data RAM address DRADD(13:0) with the LPA of the input address. The cache control logic 70 sets the Read/Write line 40 to Write and the main memory data on the P-bus 32 is stored in the data RAMs 35 at the proper location.

As discussed above, the failure detection logic 99 places a cache controller failure signal on the line 46 in response to the multiple HIT signal on the line 100. The failure detection logic 99 may be configured in a conventional manner to detect other conditions requiring disabling of the cache controller 30. For example, the failure detection logic 99 may sense if an invalidation cycle does not complete thereby potentially degrading the data integrity of the system. The failure detection logic 99 may be responsive to various logic points within the controller 30 which under predetermined conditions can be tested for appropriate values. The failure detection logic 99 thereby provides the CACHE PRESENT 0 signal on the line 46 and the corresponding logic in the cache controller 31 generates the CACHE PRESENT 1 signal on the line 48 (FIG. 1) which together, as described above, control the system to operate either in a normal or degraded mode.

Referring to FIG. 3, in which like reference numerals indicate like components with respect to FIG. 2, the data storage in one of the tag RAM stacks 77a–77d, e.g. 77a, is illustrated. The tag RAM stack 77a is 2K Words deep by 16 bits wide. Each word contains a 14 bit UPA field 110 for storing the UPA address tag, a 1 bit field 111 for storing the least significant address bit ADD(0), and a 1 bit field 112 for storing the validity bit.

During search operations, LPA address bus 90 accesses one of the 2K locations in the tag RAM stack 77a in parallel with the TAG 1–TAG 3 stacks under appropriate Read/Write control on the line 91. The accessed tag data is provided on the bus 92, as described above. In performing a fill operation, the LPA address on the bus 90 accesses the appropriate location and the index signals on the bus 103 select the appropriate TAG stack. The fill data is provided on the bus 92 and the operation is appropriately controlled by the Read/Write signal on the line 91. The 2K addresses of the tag RAM stack 77a are illustrated in hexadecimal along the left hand edge of the stack.

In general, with reference to FIGS. 1–3, each of the two cache controllers 30 and 31 contains p tag array sets of $2^n$ rows by m bits. Combined, the two cache controllers manage an array of $2(p)*(2^n)$ data words, where one of the p sets is illustrated in FIG. 3. Thus, each cache controller is capable of mapping the cache to a memory address range of $2^{n+m}$ words and the two cache controllers combined map the cache system to a memory address range of $2^{n+m+1}$ words. The least significant memory address bit is stored in field 111 along with the remainder of the tag in fields 110 and 112, as illustrated in FIG. 3.

Figure 4:
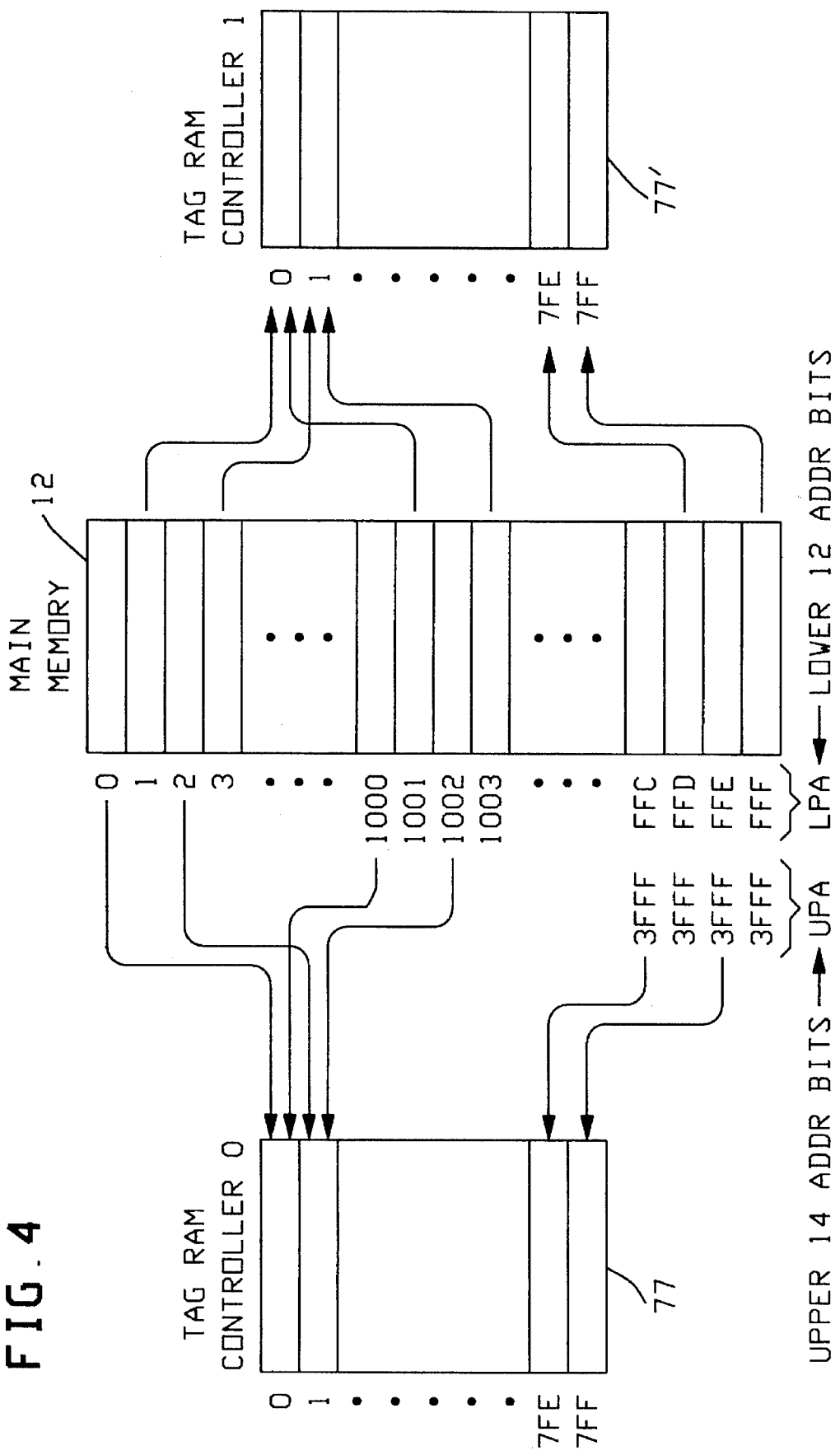
FIG. 4 is a memory map diagram illustrating the mapping of main memory addresses into the tag RAMs of the cache controllers of FIG. 1.

Referring to FIG. 4, in which like reference numerals indicate like Components with respect to FIGS. 1–3, the mapping of main memory addresses into the cache tag RAMs in the two cache controllers is illustrated. Reference numeral 77' is utilized to denote the tag RAM in controller 31 corresponding to the tag RAM 77 in the controller 30. The address indications are in hexadecimal. As is seen, the even addresses of the 64M word main memory 12 are mapped into the 2K locations of the tag RAMs 77 and the odd main memory addresses are mapped into the 2K locations of the tag RAMs 77'. The 2K deep tag RAM 77 and the 2K deep tag RAM 77' may be considered as one 4K deep tag RAM structure 77, 77'. Main memory addresses having the same LPA are mapped into a unique location of the tag RAM 77, 77'. As discussed above, the UPA is stored at the location to uniquely identify the main memory address.

As described above, each of the tag RAMs 77 and 77' is comprised of four stacks of 2K locations each. Therefore, the combined tag RAM structure 77, 77' can store four different UPAs for a given LPA. For example, addresses 1009, 2009, 3009, and 4009 all share the same LPA (009) but have UPAs of 1, 2, 3 and 4, respectively. The hexadecimal addresses of the locations of the arrays illustrated in FIG. 4 are shown to the left of the locations.

FIG. 4 illustrates that the cache is divided into two slices, each slice having one-half of main memory mapped locations. If one slice malfunctions, the other slice assumes all the memory locations and cache operations for the failed cache module. System performance does not substantially degrade if one slice fails.

In operation, referring to FIGS. 1–4, with both cache controllers 30 and 31 present, the shared cache control logic 41 and the invalidation spy control logic 60, in response to ADD(0) of incoming processor request addresses and incoming invalidation addresses, respectively, direct the odd and even addresses to the independently functioning cache controllers 30 and 31, respectively, for processing. The controllers operate as interleaved cache slices with respect to the even and odd addresses. In the interleaved, non-degraded mode of operation, the least significant bit of the incoming address is not utilized since it always matches the stored address bit 0 in field 111 of the stored tag.

Because of the independent operability of the cache controllers 30 and 31, when the processor 20 initiates a tag search on one cache slice, the other cache-slice is otherwise idle and can therefore perform invalidation operations. Additionally, when a request from the processor 20 is not in effect, both cache slices can simultaneously perform invalidations. The above-described architecture permits overlapping invalidations with processor accesses of the cache and cache fill operations. Thus, the cache memory system of the present invention reduces the "busy" times that deny the processor 20 access to the cache.

This capability of simultaneous operation significantly reduces the time required for block invalidations since invalidation cycles can be simultaneously performed by the cache controllers 30 and 31 with respect to the even and odd addresses of the block, respectively. The block address counter logic 73 transforms four-word invalidations into two independent two-word invalidations. The two-word invalidations are simultaneously executed in the respective cache slices. The invalidation spy control logic 60 sends the first address of a four-word block to both active cache slices and the invalidation logic within each controller generates the addresses within the block to be invalidated by that controller. For example, if the invalidation spy control logic 60 detects that an invalidation cycle should be performed with respect to the block starting at address 6000, and both slices are active, address 6000 is sent to both controllers. The "even" controller invalidates only the even addresses 6000 and 6002 within the block and the "odd" controller invalidates only the odd addresses 6001 and 6003. Therefore, when both Slices are present with the cache operating in an interleaved mode, four-word invalidations require only that the $2^1$ bit of the address be toggled in each slice.

In the non-degraded mode, cache operations are invoked by the independent CACHE REQUEST signals on the lines 44 and 45 and/or the independent invalidation requests on the lines 67 and 68. The cache controller 30 is only solicited for the even address functions, while the odd addresses only solicit the cache controller 31. The least significant memory address bit, ADD(0), controls this interleaving function and each slice stores the respective even/odd least significant address bit in its tag field 111.

When one of the cache controllers 30 and 31 degrades, suspending operations, all processor and invalidation requests for cache service are directed to the remaining operational controller. The operational controller, in the degraded system mode of operation, responds to both even and odd addresses. For example, if the "odd" cache controller 31 degrades, the cache controller slice 30 assumes the processing of both odd and even addresses. Initially, the controller 30 will not generate HITS for odd addresses since the tag field 111 will only store a 0 for the least significant address bit. Within a very short time, however, after the "odd" slice has been degraded, the "even" cache controller 30 will fill with both odd and even addresses. The least significant address bit that is stored in the tag field 111 will assume values of 1 and 0, thereby permitting the single operational cache slice to continue to map the full range of $2^{n+m+1}$ main memory addresses. This operation provides seamless assumption of the full main memory address range by a remaining operational cache slice which, in normal operation, managed only the odd or even addresses within that range. The CACHE PRESENT signals on the lines 46 and 48 degrade the cache by removing one group of cache tag RAMs from operation while mapping the main memory address space into the one remaining cache slice.

In the degraded mode, when performing invalidation cycles for address blocks, the operational slice assumes responsibility for invalidating all four words in the block and for responding to the least significant address bit for both odd and even addresses on single word invalidations. Having stored the least significant address bit as part of the tag facilitates the transition between normal and degraded operation as the faulted cache slice degrades. As described above, in the degraded mode a four-word invalidation requires the invalidation address incrementing logic 73 (FIG. 2) to provide the appropriate invalidation address for both bit $2^0$ as well as for bit $2^1$. The invalidation logic switches from the two-word mode to the four-word mode in accordance with the cache degrade signal from the other slice; e.g., CACHE PRESENT 1 on line 48 (FIG. 2).

The above-described slice architecture provides improved fault tolerance. If one cache controller should suffer a fatal error, the entire cache memory system does not need to be taken off-line. Only the faulty controller is disabled and the cache system can proceed to function with only one operational controller. The degraded mode of operation results in diminished cache depth but retains the original set associativity between the main memory address range and the number of tag RAM sets over which an address search is performed. Thus, in the degraded mode of operation, the original HIT ratio is substantially maintained. This fault tolerant operation is facilitated by storing the ADD(0) bit in the tag RAM along with the UPA. This bit normally determines which array should be checked for a tag HIT. When the system degrades to operation with one slice and addresses are received that had been stored in the disabled controller, the ADD(0) tag is utilized to distinguish between the stored and unstored addresses so as to generate appropriate cache MISS signals.

It is appreciated that in the interleaved-slice architecture described above, if one cache slice experiences a hardware fault, the other slice assumes the functions of the other. System operation is not interrupted while the cache degrades its resources. The seamless degradation of cache resources in the presence of a hardware fault improves the overall system availability. The above-described cache architecture comprises two cache slices each having a cache controller for one-half of the cache tags. When both slices are functioning, one slice manages the odd memory addresses and the other slice manages the even memory addresses. If one slice degrades, the other slice uses its cache controller and its half of the cache tags to manage both even and odd memory addresses including both processor cache requests and system induced cache invalidations.

The invention utilizes an interleaved cache controller architecture to support cache controller fault tolerance by mapping of the ADD(0) address line that is utilized as the interleave selection line, into the cache tag array. Cache degrade signals between the cache slices indicate if the normal mode or degraded mode of operation is in effect. The invention switches the interleaving selection logic to an always active state when the degraded mode of operation is in effect to direct all functions to the operational slice. The logic that generates the invalidation operations is switched from an interleaved mode to a non-interleaved mode under the control of the cache degrade signals. It is appreciated that operation in a normal or degraded mode is controlled by the CACHE PRESENT signals.

The present invention provides a cost effective way to add fault tolerance to an interleaved cache slice architecture. Fault tolerance is achieved in the interleaved architecture with a minimum of additional resources. The above-described cache architecture is redundant in only one bit in the tag RAMs and in replication of cache controller logic. This is considerably more economical than the above-described prior art approaches in terms of both cost and board area. The inclusion of a fault tolerance attribute in the cache controller improves the overall availability of the system.

The invention was described in terms of two disjoint address groups, specifically the even and odd groups. It is appreciated that more than two address groups can be utilized in practicing the invention with corresponding address bits used to distinguish between the groups.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. In a computer system having a processor, a main memory and a cache memory system for use by said processor, said main memory storing main memory data at main memory locations accessible by a main memory address having a predetermined number of main memory address bits, said cache memory system comprising:

cache data storage means for storing cached data from said main memory, first and second cache controllers including failure detection logic for generating cache present signals to determine if either said first or said second cache controller has failed, said main memory address bits comprising first and second portions and further comprising a least significant bit identifying even and odd main memory addresses, and address switching means responsive to input main memory addresses and to said least significant bit for directing, under control of and in accordance with said least significant bit, even and odd input main memory addresses to said first and second cache controllers for processing, respectively, when said cache present signals indicate said first and said second cache controllers are operational, said first and second cache controllers including respective first and second tag storage sections for storing tags indicating if said cache data storage means is storing cached data from said input main memory addresses directed thereto, said first and second tag storage sections being addressed by said first portion of said main memory address bits, said stored tags comprising said second portion and said least significant bit of said main memory address bits, said address switching means being responsive to said cache present signals for directing all of said even and odd input main memory addresses to an operational cache controller when said cache present signals indicate said first or said second cache controller has failed, said least significant bit controlling to which of said first and second cache controllers to direct said even and odd input main memory addresses for processing, respectively, when said first and second cache controllers are operational, said least significant bit thereby functioning as an addressing bit, said least significant bit being included in said stored tags to distinguish between said even and odd input main memory addresses in an operational cache controller when either said first or said second cache controller has failed, said least significant bit thereby functioning as a stored tag bit.

2. The cache memory system of claim 1 wherein said even and odd input main memory addresses comprise even and odd processor request addresses.

3. The cache memory system of claim 1 further including invalidation cycle control means and wherein said even and odd input main memory addresses comprise even and odd cache invalidation cycle request addresses.

4. The cache memory system of claim 1 wherein said first and second portions of said main memory address bits comprise a lower significant bit portion and an upper significant bit portion, respectively, said stored tags thereby comprising said upper significant bit portion and said least significant bit of said main memory address bits.

5. The cache memory system of claim 4 wherein each said first and second cache controller includes HIT logic comparison means responsive to said stored tags and to said input main memory addresses for comparing said upper significant bit portion and said least significant bit which comprise said stored tags with said upper significant bit portion and said least significant bit of said input main memory addresses and providing a HIT signal or a MISS signal in accordance with equality or inequality therebetween, respectively, said HIT logic comparison means thereby distinguishing between said even and odd input main memory addresses in an operational cache controller, when either said first or said second cache controller has failed, by comparing said least significant bit of said stored tags with said least significant bit of said input main memory addresses.

6. The cache memory system of claim 5 wherein said input main memory addresses comprise processor request addresses, said system further including means responsive to said MISS signal for retrieving data from main memory corresponding to a processor request address that resulted in said MISS signal and storing said retrieved data in said cache data storage means, each one of said first and second cache controllers including fill means for storing tag data in said tag storage section included in said one cache controller, said stored tag data corresponding to said processor request address that resulted in said MISS signals, said tag storage section included in said one cache controller thereby filling with stored tag data corresponding to even and odd processor request addresses and said cache data storage means thereby filling with cached data corresponding to said even and odd processor request addresses when the other of said cache controllers has failed.

7. The cache memory system of claim 5 wherein each said first and second tag storage sections includes plural tag storage stacks simultaneously addressable by said lower significant bit portion.

8. The cache memory system of claim 7 wherein each said tag storage stack includes a plurality of tag locations accessible by said lower significant bit portion, corresponding locations in said plural tag storage stacks accessible by a particular lower significant bit portion and storing different upper significant bit portions, respectively.

9. The cache memory system of claim 8 wherein said HIT logic comparison means is operative for simultaneously comparing said different upper significant bit portions with said upper significant bit portion in said input main memory address.

10. The cache memory system of claim 3 wherein each said cache invalidation cycle request address includes a block bit designating if said cache invalidation cycle request address designates a block of invalidation addresses.

11. The cache memory system of claim 10 wherein said first and second cache controllers include first and second block address control logic responsive to input cache cycle invalidation request addresses, said block bit and said cache present signals, said first and second block address control logic generating even and odd invalidation addresses in a block, respectively, in response to said block bit when said cache present signals indicate said first and said second cache controllers are operational, said first or second block address control logic in an operational cache controller generating even and odd invalidation addresses in a block in response to said block bit when said cache present signals indicate said first or said second cache controller has failed.

12. The cache memory system of claim 1 wherein each of said first and second cache controllers is constructed and arranged to continue processing said input main memory addresses directed thereto when the other of said first and second cache controllers has failed.

13. The cache memory system of claim 1 wherein said cache data storage means comprises means for storing said cached data from said main memory intermixed with respect to said even and odd main memory addresses.

14. The cache memory system of claim 1 wherein each said first and second cache controller includes HIT logic comparison means responsive to said stored tags and to said input main memory addresses for comparing said second portion and said least significant bit which comprise said stored tags with said second portion and said least significant bit of said input main memory addresses and providing a HIT signal or a MISS signals in accordance with equality or inequality therebetween, respectively, said HIT logic comparison means thereby distinguishing between said even and odd input main memory addresses in an operational cache controller, when either said first or said second cache controller has failed, by comparing said least significant bit of said stored tags with said least significant bit of said input main memory addresses.

15. The cache memory system of claim 14 wherein said input main memory addresses comprise processor request addresses, said system further including means responsive to said MISS signal for retrieving data from said main memory corresponding to a processor request address that resulted in said MISS signal and storing said retrieved data in said cache data storage means, each one of said first and second cache controllers including fill means for storing tag data in said tag storage section included in said one cache controller, said stored tag data corresponding to said processor request address that resulted in said MISS signal, said tag storage section included in said one cache controller thereby filling with stored tag data corresponding to even and odd processor request addresses and said cache data storage means thereby filling with cached data corresponding to said even and odd processor request addresses when the other of said cache controllers has failed.

* * * * *